Patented Oct. 29, 1940

2,219,331

UNITED STATES PATENT OFFICE 2,219,331

VITREOUS BODY

Marcello Pirani, South Kenton, Middlesex, and John Henry Partridge, Pinner, Middlesex, England, assignors to General Electric Company, a corporation of New York No Drawing. Application December 1, 1937, Serial No. 177,522. In Great Britain December 2, 1936

3 Claims. (Cl. 106—36.1)

This invention relates to the manufacture of vitreous or mainly vitreous bodies having melting points substantially higher than 1600° C. The term "mainly" implies that, if the bodies are not completely vitreous, they must contain a proportion of vitreous material so large that they are impervious to gas, and not greatly lower than that of quartz. Since the melting point of a vitreous material is not always well defined, it is to be understood that it is to be estimated in a manner which gives to the melting point of vitreous silica the accepted value, namely 1715° C.

Vitreous bodies having such high melting points are useful as intermediate glasses in the sealing of conductors through quartz, as explained in British Patent Specification No. 463,889, and as sheaths in high-pressure metal vapour discharge devices, as explained in British application No. 25,745/36. They may also find other applications, when once a suitable method of manufacturing them has been found. The object of this invention is to provide such a method.

In the said British Specification No. 463,889, published after the date of this application, such methods are proposed when the bodies have compositions within a certain range and are adapted to serve as intermediate glasses as aforesaid. One of these methods is to prepare a coherent body of the desired composition according to the usual methods of the ceramic art and then, by heating it to an appropriately high temperature, to convert some or all of it into the vitreous state. In the said application, it was proposed that the body might be glazed on the surface by heating in an oven and that further conversion to the vitreous state might be effected when the body was sealed to quartz to serve as an intermediate glass.

It has been found that this method is of great generality and utility, and can be used to make wholly or partially vitreous bodies of any material that will yield a glass at all at temperatures that can be reached in ovens or flames. Such a temperature of 2300° C. can be reached in the atomic hydrogen "flame", produced by the method generally associated with the name of Langmuir, and described for example in the General Electrical Review, vol. 29, p. 153–168, 1926. Extremely refractory glasses can be produced by such methods.

According to the invention the manufacture of a vitreous or mainly vitreous body having a melting point substantially higher than 1600° C. comprises the steps (1) of forming by the methods of the ceramic art a coherent substantially non-vitreous body substantially of the composition of the body finally required and (2) of heating the said body to a temperature such that a considerable part or all of it is converted into a glass. The word "substantially" implies that the non-vitreous body may contain ingredients that are removed by evaporation, oxidation or the like in the subsequent step 2.

In the simplest form of the manufacture according to the invention, the non-vitreous body is a rod (say) 2 or 3 mm. thick. In step 2 it is fed into a sufficiently hot flame, and molten material drawn out of the flame on the further side in the manner well-known in the glass blowing art.

It is possible by this means to obtain in an almost completely vitreous form materials which are so refractory that they are hardly obtainable in that form by other methods.

Examples of such materials are the following:

|  | I | II | III |
|---|---|---|---|
|  | Percent | Percent | Percent |
| $SiO_2$ | 96 | 95 | 94 |
| $ZrO_2$ | 3 | 1.4 |  |
| $ThO_2$ |  | 2.5 | 4 |
| MgO | 1 |  |  |
| CaO |  | 0.1 |  |
| BeO |  | 1.0 | 2 |

The melting points of all these materials are close to those of pure vitreous silica.

All these materials contain a relatively small proportion, for example less than 4%, of some constituent. It is then difficult to obtain a mixture in which this constituent is uniformly distributed, as it must be if the process is to be successful. A device known per se may then be used; the ingredients are mixed mechanically; they are then sintered, so as to form a coherent mass; this coherent mass is ground and sintered once more. By repeating this process, a mixture of the necessary uniformity can always be obtained.

We claim:

1. A refractory, vitreous gas impervious material consisting of at least 94% silica, at least 2.5% thoria and from 2 to 2.5% of one or more oxides from the group consisting of zirconia, calcium oxide and beryllia and having a softening point higher than about 1600° C.

2. A refractory, vitreous gas impervious material consisting of

| | Percent |
|---|---|
| Silica ($SiO_2$) | 95 |
| Zirconia ($ZrO_2$) | 1.4 |
| Thoria ($ThO_2$) | 2.5 |
| Calcium oxide (CaO) | 0.1 |
| Beryllia (BeO) | 1.0 |

3. A refractory, vitreous gas impervious material consisting of

| | Percent |
|---|---|
| Silica ($SiO_2$) | 94 |
| Thoria ($ThO_2$) | 4 |
| Beryllia (BeO) | 2 |

MARCELLO PIRANI.
JOHN HENRY PARTRIDGE.